(12) United States Patent
Ng et al.

(10) Patent No.: US 11,254,068 B2
(45) Date of Patent: Feb. 22, 2022

(54) THREE-DIMENSIONAL (3D) PRINTING METHOD

(71) Applicant: Hewlett-Packard Development Company, L.P., Houston, TX (US)

(72) Inventors: Hou T. Ng, Campbell, CA (US); Sivapackia Ganapathiappan, Los Altos, CA (US); Alejandro Manuel De Pena, Sant Cugat del Valles (ES); Edward Dale Davis, Poway, CA (US); Ali Emamjomeh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 867 days.

(21) Appl. No.: 15/518,229

(22) PCT Filed: Oct. 29, 2014

(86) PCT No.: PCT/US2014/062818
§ 371 (c)(1),
(2) Date: Apr. 10, 2017

(87) PCT Pub. No.: WO2016/068899
PCT Pub. Date: May 6, 2016

(65) Prior Publication Data
US 2017/0252974 A1 Sep. 7, 2017

(51) Int. Cl.
*B29C 67/24* (2006.01)
*B29C 64/165* (2017.01)
(Continued)

(52) U.S. Cl.
CPC .......... *B29C 67/247* (2013.01); *B22F 1/0062* (2013.01); *B22F 10/10* (2021.01);
(Continued)

(58) Field of Classification Search
CPC ....... B22F 1/0062; B33Y 10/00; B33Y 30/00; B33Y 50/00; B33Y 70/00; B33Y 90/00;
(Continued)

(56) References Cited

U.S. PATENT DOCUMENTS 5,382,308 A * 1/1995 Bourell ................. B29C 64/153
156/62.2
5,749,041 A 5/1998 Lakshminarayan et al.
(Continued)

FOREIGN PATENT DOCUMENTS

JP 2005144870 6/2005
WO WO-2004/094089 11/2004

OTHER PUBLICATIONS

Adler Technology Blog, Piezoelectric Print Heads Vs.Thermal Print Heads, https://aldertech.com/piezoelectric-print-heads-vs-thermal-print-heads/, downloaded on Feb. 11, 2019 (Year: 2014).*
(Continued)

*Primary Examiner* — Jacob T Minskey
*Assistant Examiner* — S. Behrooz Ghorishi
(74) *Attorney, Agent, or Firm* — Dierker & Kavanaugh PC

(57) ABSTRACT

In an example of a three-dimensional (3D) printing method, a build material (consisting of an inorganic particle and a polymer attached thereto) is applied. The polymer is a continuous coating having a thickness from about 3 nm to about 1500 nm, or nano-beads having an average diameter from about 3 nm to about 1500 nm. The build material is heated to a temperature from about 5° C. to about 50° C. below the polymer's melting point. A coalescent dispersion (including a coalescent agent and inorganic nanoparticles) is selectively applied on a portion of the build material, and the applied build material and coalescent dispersion are exposed to electromagnetic radiation. The coalescent dispersion
(Continued)

absorbs the electromagnetic radiation and heats up the portion of the build material in contact therewith to fuse the portion of the build material in contact with the coalescent dispersion and to form a layer of a 3D object.

16 Claims, 4 Drawing Sheets

(51) Int. Cl.
  *B22F 1/00* (2006.01)
  *B29C 64/153* (2017.01)
  *B22F 10/10* (2021.01)
  *B33Y 30/00* (2015.01)
  *B33Y 10/00* (2015.01)
  *B33Y 50/00* (2015.01)
  *B33Y 50/02* (2015.01)

(52) U.S. Cl.
  CPC .......... *B29C 64/153* (2017.08); *B29C 64/165* (2017.08); *B33Y 30/00* (2014.12); *B33Y 10/00* (2014.12); *B33Y 50/00* (2014.12); *B33Y 50/02* (2014.12)

(58) Field of Classification Search
  CPC ......... B29C 64/10; B29C 64/20; B29C 64/30; B29C 64/40
  See application file for complete search history.

(56) References Cited

U.S. PATENT DOCUMENTS

| | | | |
|---|---|---|---|
| 7,431,987 B2 | 10/2008 | Pfeifer et al. | |
| 7,611,756 B2 | 11/2009 | Pfeifer et al. | |
| 2004/0224173 A1 | 11/2004 | Boyd et al. | |
| 2006/0251535 A1 | 11/2006 | Pfeifer et al. | |
| 2007/0183918 A1 | 8/2007 | Monsheimer et al. | |
| 2007/0241482 A1* | 10/2007 | Giller | B29C 64/165 |
| | | | 264/494 |
| 2014/0314613 A1 | 10/2014 | Hopkinson | |
| 2016/0236412 A1* | 8/2016 | Kusahara | B22F 1/0062 |

OTHER PUBLICATIONS

International Search Report and Written Opinion for International Application No. PCT/US2014/062818 dated Jul. 14, 2015, 13 pages.

* cited by examiner

THREE-DIMENSIONAL (3D) PRINTING METHOD

BACKGROUND

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the combined application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
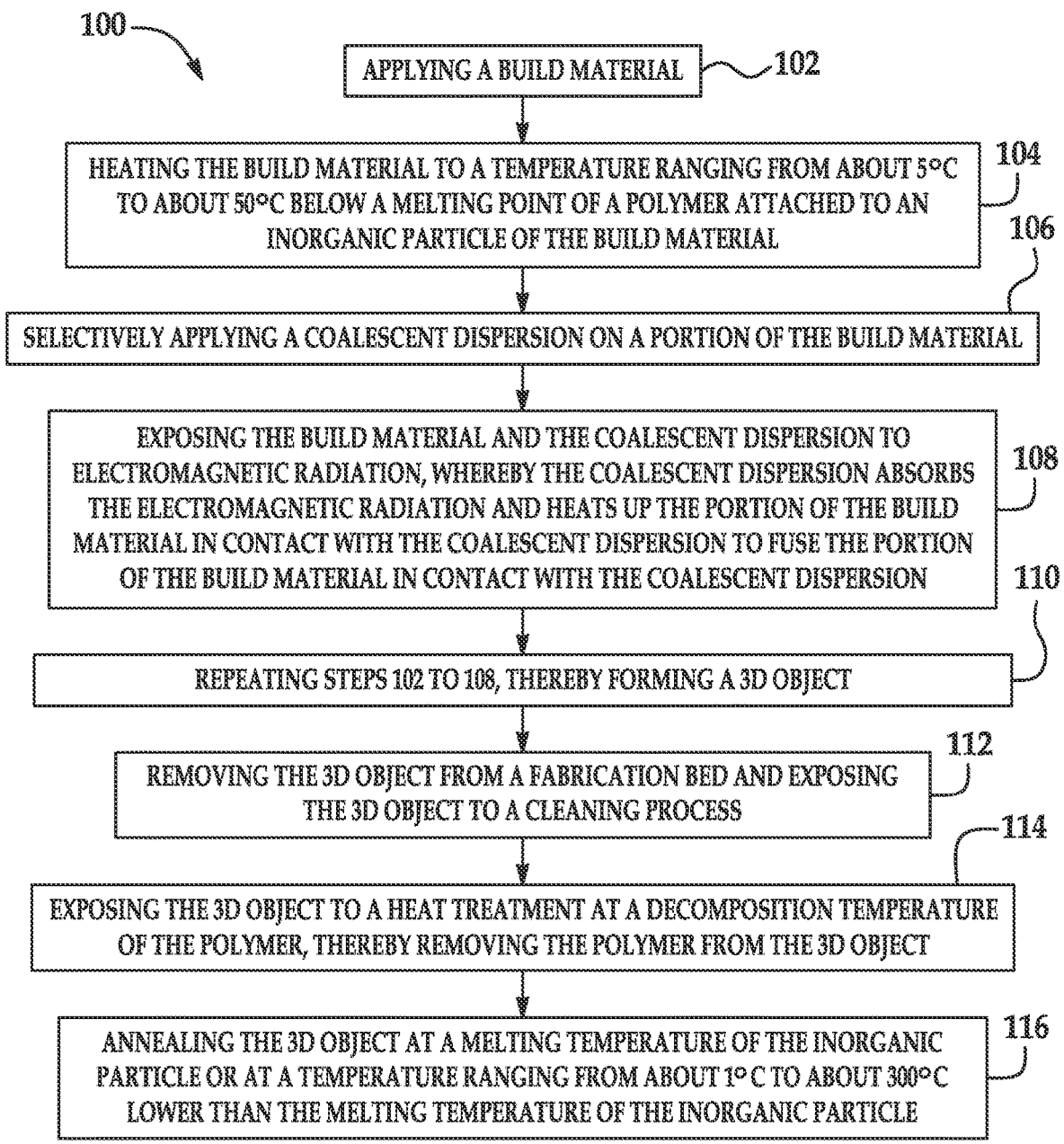
FIG. 1 is a flow diagram illustrating an example of a 3D printing method disclosed herein.

Examples of the three-dimensional (3D) printing method and system disclosed herein are based on a 3D fabrication process that involves the use of electromagnetic radiation for fusing a build material using an inkjet applied coalescent dispersion to selectively define the 3D object/part in question (layer by layer). During this 3D fabrication process, an entire layer of a build material is exposed to the electromagnetic radiation, but only a selected region of the build material is fused and hardened to become a layer of the 3D object. The method includes the application of the coalescent dispersion so that it is selectively deposited onto a portion of the build material at the selected region. The coalescent dispersion is capable of absorbing the radiation and converting the absorbed radiation to thermal energy, which in turn melts and/or sinters the build material that is in contact with the coalescent dispersion. This causes the build material to fuse, which forms a layer of the 3D object.

In the examples disclosed herein, both volume shrinkage and surface roughness of each layer of the 3D object are reduced during the production process, rather than during post-production processing. It is believed that the improved characteristics are due, in part, to an improved packing density (i.e., powder compaction) of each layer of the build material and to a reduction of air voids within each layer of the build material during the production process. The improved packing density and the reduction of air voids in the examples disclosed herein are the result of the combination of the build material and coalescent dispersion.

The build material includes inorganic particles, each of which has a polymer attached thereto in the form of a thin continuous coating or as nano-beads. The thin continuous coating or nano-beads incorporate the binding material directly on the inorganic particle surface, and thus additional binding materials are not included in the build material. Without the additional binding materials physically separating the build material particles, the build material particles are able to compact more efficiently, which leads to a reduced number of air voids (i.e., empty space within the layer for particles to occupy when melted/sintered/fused during production processing). In addition, the thin continuous coating or nano-beads introduce an amount of polymer that is suitable for binding purposes, but does not create a large gap between build material particles upon polymer decomposition that takes place during the production process. Smaller gaps between the build material particles after polymer decomposition lead to decreased volume shrinkage.

The coalescent dispersion includes inorganic nanoparticles that can fill the air voids between larger build material particles. This creates a denser layer and reduces the volume of empty space within the layer for particles to occupy when melted/sintered/fused during production processing.

In the examples disclosed herein, the build material and coalescent dispersion are efficiently compacted, and thus the build material particles are able to melt/fuse/sinter without significant movement into unoccupied spaces. As such, volume shrinkage is reduced. This leads to layer coating uniformity and reduced layer surface roughness. Both of these characteristics positively influence the physical attributes of the resulting 3D object without having to use post-production mechanical refining processes (e.g., tumbling, stone polishing, etc.).

Since volume shrinkage is reduced, the final 3D object may be formed with fewer layers than an object that incorporates additional layers to compensate for the shrinkage. As such, in some examples, a smaller amount of the build material and coalescent may used to produce each layer of the 3D object.

An example of the 3D printing method 100 is depicted in FIG. 1, and an example of the printing system 10 used in various steps of the method 100 is shown in FIGS. 3A through 3E. It is to be understood that each of the steps of the method 100 shown in FIG. 1 will be discussed in detail herein, and in some instances, FIGS. 2A through 2B and 3A through 3F will be discussed in conjunction with FIG. 1.

Figure 3A:
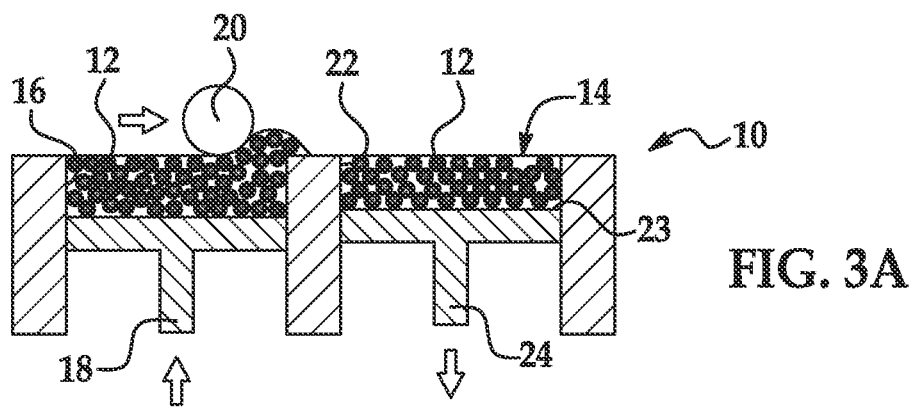
FIGS. 3A through 3D are semi-schematic, cross-sectional views of the steps involved in forming one layer of a 3D object using an example of the 3D printing method and system disclosed herein.

As shown at reference number 102 in FIG. 1 and in FIG. 3A, an example of the method 100 includes applying a build material 12 using the 3D printing system 10. In the example shown in FIG. 3A, one layer 14 of the build material 12 has been applied, as will be discussed in more detail below.

Figure 2A:
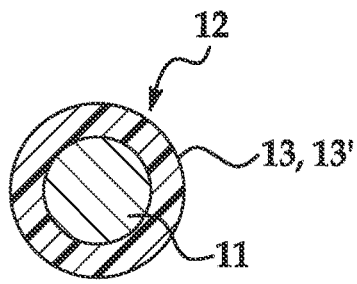
FIGS. 2A and 2B are cross-sectional views of examples of the build material used to form layer(s) of a 3D object.
Figure 2B:
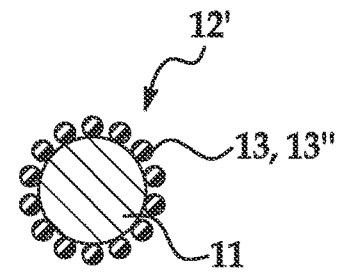

Different examples of the build material 12 and 12' are shown, respectively, in FIGS. 2A and 2B. It is to be understood that each example of the build material 12, 12' may be used in the method 100 and the system 10 disclosed herein. The build material 12, 12' consists of an inorganic particle 11 and a polymer 13 attached to the inorganic particle 11. In an example, the build material 12, 12' is made up of the inorganic particle 11 having the polymer 13 attached thereto, and no other components. In another example, the build material 12, 12' is made up of the inorganic particle 11 having the polymer 13 attached thereto, as well as charge agent(s) and/or flow aid(s).

The build material 12, 12' may include a plurality of the inorganic particles 11, each of which has the polymer 13 attached thereto in some form (e.g., as the continuous coating 13' shown in FIG. 2A, or as the nano-beads 13" shown in FIG. 2B). The amount of polymer 13 present in the build material 12, 12' depends upon the amount of inorganic particles 11 present in the build material 12, 12'. In an example, the polymer 13 may be present in an amount ranging from about 0.1 wt % to about 10 wt % of a total weight percent of the inorganic particle(s) 11 in the build material 12, 12'. In another example, the polymer 13 may be present in an amount ranging from about 1 wt % to about 5 wt % of the total weight percent of the inorganic particle(s) 11 in the build material 12, 12'. It is to be understood that the inorganic particle(s) 11 make up the remaining weight percent of the build material Examples of suitable materials for the inorganic particle(s) 11 include a metal, a metal alloy, a metal oxide, a ceramic, or mixtures of these materials. Some examples of the metal include stainless steel, copper, titanium, niobium, tin, and/or aluminum. Alloys of the previously listed metals (with or without other metals) may be used, such as $Ti_6Al_4V$; an alloy with 58% Ni, 21.5% Cr, 9.0% Mo, 0.50% Mn, 0.10% C, 0.50% Si, and 5.0% Fe (commercially available as INCONEL® 625 by HP Alloy); $AlCu_4Mg$; a steel alloy with 92.8% to 96.2% Fe, 2.25% to 3.50% Ni, 1.00% to 1.80% Cr, about 0.25% Cu, 0.20% to 0.60% Mo, 0.15% to 0.35% Si, 0.12% to 0.20% C, 0.10% to 0.40% Mn, about 0.030% V, about 0.025% P, about 0.025% S, and about 0.020% Ti (commercially available as HY100 by Azo Materials); and a bronze alloy. Another commercially available alloy includes HY45 (which consists of the same metals as HY100 in different percentages). In addition, examples of suitable metal oxides include alumina (i.e., aluminum oxide or $Al_2O_3$), tin oxide ($SnO$ or $SnO_2$), zinc oxide ($ZnO$), yttrium oxide ($Y_2O_3$), zirconium oxide ($ZrO_2$), bismuth oxide ($Bi_2O_3$), niobium oxide ($NbO_2$ or $Nb_2O_5$), and tantalum oxide ($Ta_2O_5$), and combinations thereof. Alumina, bismuth oxide, niobium oxide, and tantalum oxide may also be suitable ceramic materials. Other suitable ceramics include those formed from mica or silica. It is to be understood that the build material 12, 12' may include a combination of the inorganic particles 11 disclosed above. For example, the build material 12, 12' may include a mixture of metal particles and metal alloy particles, or a mixture of metal particles and ceramic particles, etc.

The inorganic particle 11 has a particle density ranging from about 1 $g/cm^3$ to about 10 $g/cm^3$. In an example, the inorganic particle 11 has a particle density of about 2 $g/cm^3$. Spherical inorganic particles 11 have a diameter (i.e., particle size) ranging from about 1 μm to about 100 μm, while non-spherical inorganic particles 11 have an average diameter (i.e., the average of multiple diameters across the particle 11) ranging from about 1 μm to about 100 μm.

The build material 12, 12' also includes the polymer 13 attached to the inorganic particle 11. The polymer 13 may have a glass transition temperature ($T_g$) ranging from about 0° C. to about 200° C. In an example, the glass transition temperature of the polymer 13 ranges from about 80° C. to about 120° C. The polymer 13 may also have a melting point less than 300° C. Some examples of the polymer 13 include polymers or copolymers formed from styrene and/or acrylic monomers, such as methyl methacrylate, butyl acrylate, and/or butyl methacrylate. Derivatives of acrylic monomers may also be used, such as acrylamide and/or maleimide. Some other examples of the polymer 13 include polyethylene (e.g., melting point of 132° C.), polypropylene (melting point of 165° C.), polyurethane, or combinations of any of the listed polymers 13. Acrylic polymers or polyurethane polymers may be formed as latex polymers, but water used to form the latex polymers is removed in order to attach the polymer to the inorganic particle 11.

In one example, the polymer may be coated onto the inorganic particle 11 in the form of the continuous coating 13', as shown in FIG. 2A. The continuous coating 13' has a thickness ranging from about 3 nm to about 1500 nm. The thickness of the continuous coating 13' may be adjusted by adjusting the polymer 13 to inorganic particle 11 ratio. In another example, the polymer 13 may be attached to the inorganic particle 11 in the form of nano-beads 13", as shown in FIG. 2B. The nano-beads 13" have an average diameter ranging from about 3 nm to about 1500 nm. The thickness of the coating formed by the nano-beads 13" may depend upon the average diameter of the individual beads, but may also be adjusted by adjusting the polymer 13 to inorganic particle 11.

The polymer 13 may be applied to the inorganic particle 11 using any suitable technique. Some examples include emulsion polymerization (micro or mini), polymer dispersion, polymer precipitation, spray drying, spray coating, or electropolymerization (i.e., growth of nano-beads or nodules). In particular, emulsion polymerization, polymer precipitation, and spray coating may be used to obtain the continuous coating 13', and spray coating or drying and electropolymerization may be used to obtain the nano-beads 13".

In an example, an emulsion or dispersion polymerization is performed to form the continuous coating 13' of the polymer 13 on the inorganic particle 11 as shown in FIG. 2A. In this example, the inorganic particles 11 and a polymer precursor (e.g., acrylic monomers) are mixed together with a hydrophobe (such as hexadecane or hexadecanol). An oil-soluble free radical initiator may also be added in an amount ranging from about 0.3 wt % to about 1 wt % of the total wt % of the monomers used. This mixture is dispersed in water by adding a suitable surfactant in an amount ranging from about 0.3 wt % to about 3 wt % of the total wt % of the monomers used. The dispersion is subjected to a heat treatment (e.g., at about 50° C. to 95° C.), which causes polymerization to take place. During the polymerization, the formed polymer 13 wraps around the inorganic particles 11. The thickness of the continuous coating 13 may be adjusted by controlling the amount of monomer that is used. This forms the continuous coating 13" on each particle 11, and thus forms the build material 12. The build material 12 is separated from the liquid component(s) using any suitable separation techniques.

The previously described emulsion or dispersion polymerization process can be carried out in solvents, such as alcohols or hydrocarbon fluids, without using the hydrophobe. In this example, as the monomers start polymerizing, the solubility of the polymer is decreased in the solvent as the polymer chain length is increased. The polymer 13 reaches a critical solubility and then phase separates from the media and forms a separate phase. Because of the presence of the inorganic particles 11 in the medium, the precipitated polymer 13 wraps around the surface of the inorganic particles 11. In order to increase the chain length of the polymer 13 (which also increases the molecular weight), a polymer stabilizer, such as polyvinylpyrrolidone, may be added. After the polymerization, both the solvent and polymer stabilizer are removed.

Figure 4:
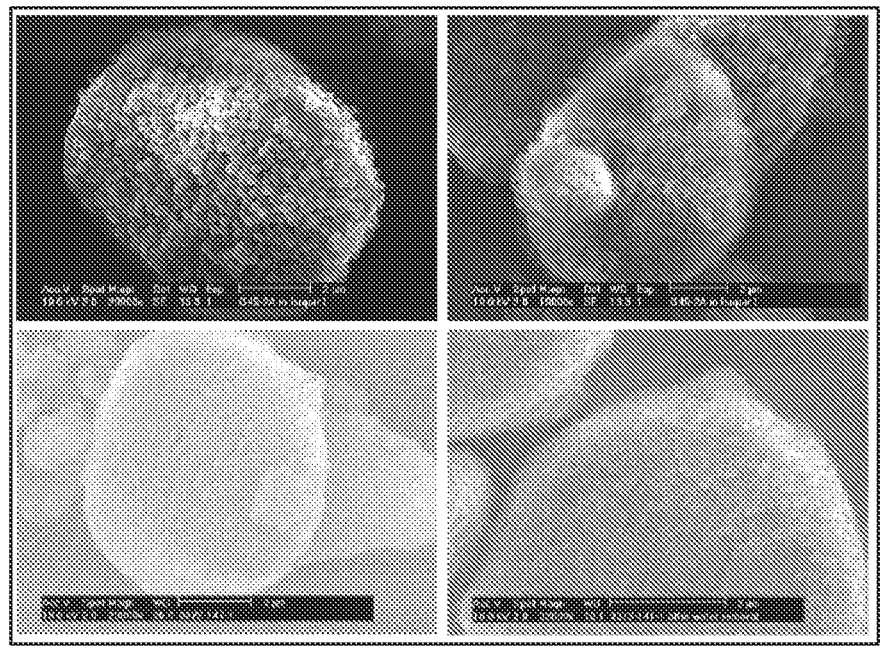
FIG. 4 illustrates scanning electron microscope (SEM) images of an example of the build material disclosed herein.

In another example, polymer precipitation may be performed with a pre-formed polyurethane or a polyurethane formed in-situ. The pre-formed polymer may be dissolved in a solvent, such as acetone or 2-pyrrolidone, or the polyurethane may be formed in this solvent. The polyurethane in the solvent is then mixed with the inorganic particles 11 to form a dispersion. The dispersion may be slowly diluted with water to precipitate the polyurethane. During precipitation, the polyurethane wraps around the surface of the inorganic particles In still another example, polymer dispersion and precipitation may be used to form the nano-beads 13" on the inorganic particle 11, as shown in FIG. 2B. The polymer 13 is in the form of nanoparticles or nano-beads having an average diameter ranging from about 3 nm to about 1500 nm, or as another example, from about 50 nm to about 300 nm. The inorganic particles 11 are mixed with the polymer 13 in water or a suitable organic solvent. This mixture has a solid content ranging from about 10% to about 50% by weight in the solvent, and the viscosity ranges from about 50 cps to about 5,000 cps. If the mixture is too dilute, phase separation of the polymer 13 from the inorganic particles 11 may result. The mixture is thoroughly mixed (e.g., to form a homogeneous mixture), and the water or organic solvent is removed at ambient temperature using vacuum filtration or forced air. During removal of the water, the polymer 13 adheres to the surface of the inorganic particles 11 (by van der Waals forces, hydrogen bonding, or ionic bonding), thereby forming the build material 12'. An example of the build material 12' produced using this example method is shown in the SEM images of FIG. 4. This build material 12' includes acrylic latex polymer nano-beads 13" coated on metal particles 11.

In yet another example, the inorganic particle 11 is coated with the polymer 13 using a spray coating technique to form the nano-beads 13" on the inorganic particle 11, as shown in FIG. 2B. In this example, a solution of the polymer 13 (in the form of nanoparticles or nano-beads) is prepared with a high vapor pressure solvent (e.g., isopropyl alcohol, ethanol, acetone, etc.) as the main carrier. In an example, the solution with the polymer 13 is mixed with the inorganic particles 11 and then the solution is spray coated. In another example, the solution with the polymer 14 is mixed with the inorganic particles 11 during spray coating. During spray coating, the solution is passed through a jet nebulizer (i.e., atomizer) at high pressure to create a high velocity mist (or aerosol) consisting of the various solution components, in addition to the inorganic particles 11. The inorganic particle 11 acts as a substrate for the polymer nanoparticles or nano-beads to deposit on.

In any of the examples disclosed herein, if the polymer 13 and the inorganic particle 11 have different surface properties that can lead to poor attachment of the polymer 13, the inorganic particle 11 may be pre-treated with a primer polymer. This primer polymer has a lower Tg than the polymer 13, for example, the primer polymer may have a $T_g$ as low as −40° C. The primer polymer adjusts the surface properties of the inorganic particle 11 so that the polymer 13 is able to adhere/attach better. When the primer polymer is used, the amount may be about 5 wt % of the total wt % of the inorganic particles 11.

The build material 12, 12' disclosed herein is generally in powder form, and is made up of several particles 11 coated with polymer 13, 13' or 13, 13". The shape of the build material 12, 12' may be the same or different. The continuous coating 13' or nano-beads 13" do not significantly alter the shape of the underlying inorganic particle 11, and thus the build material 12, 12' maintains a similar shape to that of the underlying inorganic particle 11. In an example, the build material 12, 12' particles have spherical or near-spherical shapes. Build material 12, 12' particles that have a sphericity of >0.84 are considered to be spherical or near-spherical in the examples disclosed herein. Thus, any build material 12, 12' particles having a sphericity of <0.84 are non-spherical.

The build material 12, 12' may be made up of similarly sized particles (as shown in FIG. 3A) or differently sized particles. In an example, the build material 12, 12' includes particles of three different sizes. In this example, the average size of the first particle is larger than the average size of the second particle, and the average size of the second particle may be larger than the average size of the third particle. The term "size", as used herein with reference to the build material 12, 12', refers to the diameter of a spherical inorganic particle 11, or the average diameter of a non-spherical inorganic particle 11 (i.e., the average of multiple diameters across the non-spherical particle) plus the thickness of the continuous coating 13' or the average diameter of the nano-beads 13". In general, the average size of the build material 12, 12' ranges from greater than 1 μm to about 102. In some examples, the average size of the build material 12, 12' ranges from about 10 μm to about 50 μm, or from about 3 μm to about 5 μm. As an example of the different sizes for each of the build material 12, 12' particles, the average size of the first particle may be greater than 6 μm, the average size of the second particle may be between 3 μm and 5 μm, and the average size of the third particle may be between 1 μm and 2 μm. In an example of the build material 12, 12' which includes several differently sized particles, the first particle may be present in an amount ranging from about 70 wt % to about 95 wt %, the second particle may be present in an amount ranging from about 0.5 wt % to about 21 wt %, and the third particle may be present in an amount ranging from greater than 0 wt % up to about 21 wt %.

The shape and size of the build material 12, 12' allow for cubic packing and/or hexagonal packing of the build material 12. The mono-, bi-, tri-, etc. modal particle size distribution described herein may affect how the build material 12, 12' can be packed when applied, e.g., to a fabrication bed. While the polymer 13 on the inorganic particle 11 increases the packing density, it is to be understood that the packing density may be further increased when a multi-modal particle size distribution is used. The smaller particles can fill in air voids between larger particles. In an example, the packing density may range from about 0.35 g/cm$^3$ to about 0.65 g/cm$^3$. When inorganic nanoparticles are included in the coalescent dispersion (reference numeral 26 discussed below), the packing density of the layer including the build material 12, 12' and the coalescent dispersion may be greater than 0.8 g/cm$^3$ (e.g., about 0.9 g/cm$^3$). Because the mono-, bi-, and tri-modal particle size distribution contributes to a layer of the build material 12, 12' having a higher packing density, the particle size distribution also contributes to the reduction in volume shrinkage and in surface roughness when each layer of the 3D object is exposed to electromagnetic radiation.

It is to be understood that build material 12, 12' may also include, in addition to the polymer 13 coated inorganic particle 11, a charging agent, a flow aid, or combinations thereof. These components may be added during the coating process.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12, 12' particles.

Flow aid(s) may be added to improve the coating flowability of the build material 12. Flow aid(s) may be particularly desirable when the build material 12, 12' particles are less than 25 μm in size. The flow aid improves the flowability of the build material 12, 12' by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), titanium dioxide, zinc oxide, or polydimethylsiloxane (E900). In an example, the flow aid is added in an amount ranging from greater than 0 wt % to less than 5 wt % based upon the total wt % of the build material 12, 12' particles.

Referring now to FIG. 3A, the printing system 10 for forming the 3D object includes a supply bed 16 (including a supply of the build material 12 and/or 12'), a delivery piston 18, a roller 20, a fabrication bed 22 (having a contact surface 23), and a fabrication piston 24. Each of these physical elements may be operatively connected to a central processing unit (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 12, 12', the coalescent dispersion 26, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the build material 12, 12' out of the opening in the supply bed 16 and the fabrication piston 24 may be programmed to move in the opposite direction of the delivery piston 18 in order to increase the depth of the fabrication bed 22. The delivery piston 18 will advance enough so that when the roller 20 pushes the build material 12, 12' into the fabrication bed 22 and onto the contact surface 23, the depth of the fabrication bed 22 is sufficient so that a layer 14 of the build material 12, 12' may be formed in the bed 22. The roller 20 is capable of spreading the build material 12, 12' into the fabrication bed 22 to form the layer 14, which is relatively uniform in thickness. In an example, the thickness of the layer 14 ranges from about 90 μm to about 110 μm, although thinner or thicker layers may also be used.

It is to be understood that the roller 20 may be replaced by other tools, such as a blade that may be desirable for spreading different types of powders, or a combination of a roller and a blade. When applying the build material 12, 12', a transversal speed of 0.1 inches per second to 100 inches per second may be used.

Figure 3B:
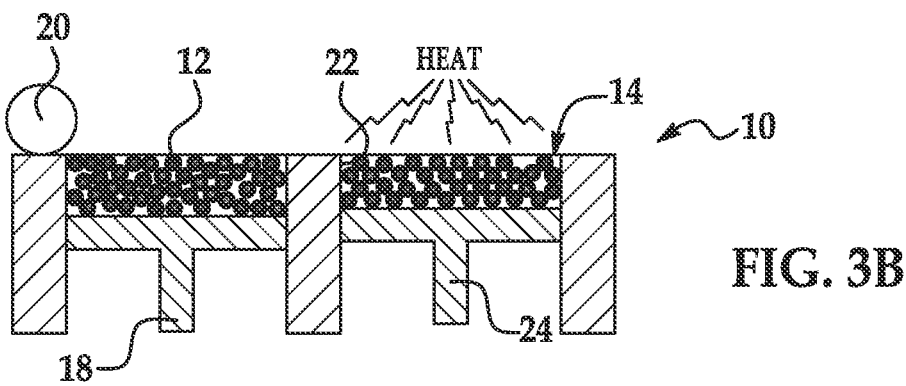

After the layer 14 of the build material 12, 12' is introduced into the fabrication bed 22, the layer 14 is exposed to heating (as shown at reference number 104 in FIG. 1 and in FIG. 3B). Heating is performed to pre-heat the build material 12, 12'. The heating temperature ranges from about 5° C. to about 50° C. below the melting point of the polymer 13 in the build material 12, 12'. As such, the heating temperature selected will depend upon the polymer 13 that is used in the build material 12, 12'. As examples, the heating temperature may be from about 5° C. to about 20° C. below the melting point of the polymer 13 in the build material 12, 12'. In an example in which the polymer 13 in the build material 12, 12' is an acrylic polymer having a melting point (or softening temperature) ranging from about 80° C. to about 120° C., the pre-heating temperature ranges from about 30° C. to about 115° C.

Pre-heating the layer 14 of the build material 12, 12' may be accomplished using any suitable heat source that exposes all of the build material 12, 12' in the fabrication bed 22 to the heat. Examples of the heat source include an electromagnetic radiation source, such as an infrared light source or near-infrared light source.

Figure 3C:
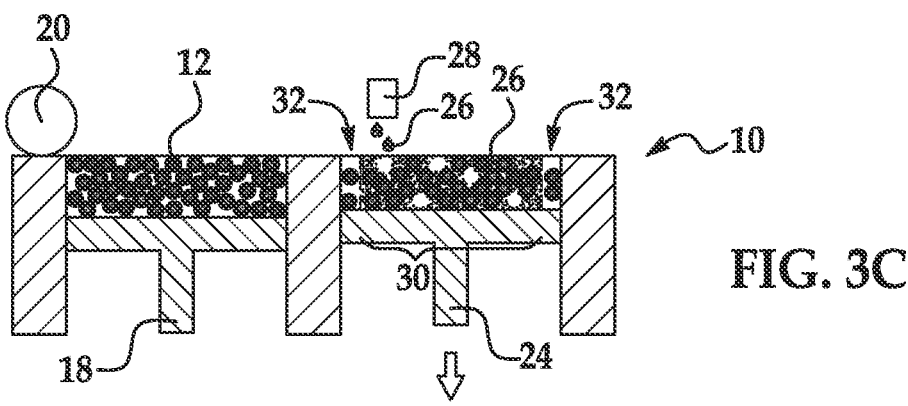
Figure 3D:
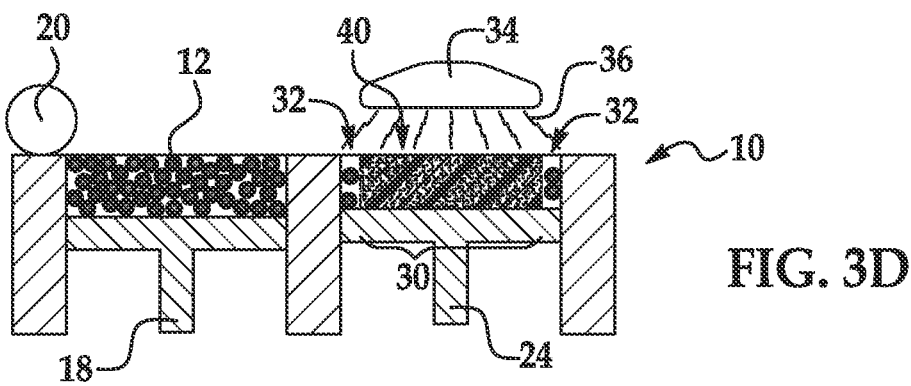

After pre-heating the layer 14, the coalescent dispersion 26 is selectively applied on a portion of the build material 12, 12' in the layer 14, as shown at reference number 106 in FIG. 1 and in FIG. 3C. As illustrated in FIG. 3C, the coalescent dispersion 26 may be dispensed from an inkjet applicator 28 (e.g., a thermal inkjet printhead or a piezoelectric inkjet printhead). While a single inkjet applicator 28 is shown in FIG. 3C, it is to be understood that multiple inkjet applicators may be used that span the width of the fabrication bed 22. The inkjet applicator(s) 28 may be attached to a moving XY stage or a translational carriage (neither of which is shown) that moves the inkjet applicator(s) 28 adjacent to the fabrication bed 22 in order to deposit the coalescent dispersion 26 in desirable area(s).

The inkjet applicator(s) 28 may be programmed to receive commands from the central processing unit and to deposit the coalescent dispersion 26 according to a pattern of a cross-section for the layer of the 3D object that is to be formed. As used herein, the cross-section of the layer of the 3D object to be formed refers to the cross-section that is parallel to the contact surface 23. The inkjet applicator(s) 28 selectively applies the coalescent dispersion 26 on those portions of the layer 14 that are to be fused to become one layer of the 3D object. As an example, if the first layer is to be shaped like a cube or cylinder, coalescent dispersion 26 will be deposited in a square pattern or a circular pattern (from a top view), respectively, on at least a portion of the layer 14 of the build material 12. In the example shown in FIG. 3C, the coalescent dispersion 26 is deposited in a square pattern on the area or portion 30 of the layer 14 and not on the areas or portions 32.

The coalescent dispersion 26 used in the examples disclosed herein is aqueous based, and includes a coalescent agent and inorganic nanoparticles dispersed in water. The aqueous nature and particular components of the coalescent dispersion 26 enhance the wetting properties of the coalescent dispersion 26, even on the build material 12, 12', which may be hydrophobic. This enables the coalescent dispersion 26 to be printed more uniformly over the build material 12 surface.

The coalescent dispersion 26 includes a suitable coalescent agent that may absorb electromagnetic radiation. As one example, the coalescent agent may be an ink-type formulation including carbon black, such as, for example, the ink formulation commercially known as CM997A available from Hewlett-Packard Company. Within the ink-type formulation, the carbon black may be polymerically dispersed. Examples of inks including visible light enhancers are dye based colored ink and pigment based colored ink, such as the commercially available inks CE039A and CE042A, available from Hewlett-Packard Company.

Examples of suitable carbon black pigments within the ink-type formulation include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

As mentioned above, the carbon black pigment may be polymerically dispersed within the ink-type formulation by a polymeric dispersant having a weight average molecular weight ranging from about 12,000 to about 20,000. The water-based ink-type formulation includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the ink-type formulation, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The ink-type formulation may be added with the nanoparticles and additional water to form the coalescent dispersion 26.

The amount of the carbon black pigment that is present in the coalescent dispersion 26 ranges from about 3.0 wt % to about 6.0 wt % based on the total wt % of the coalescent dispersion 26. In other examples, the amount of the carbon black pigment present in coalescent dispersion 26 ranges from greater than 4.0 wt % up to about 6.0 wt %. It is believed that these pigment loadings provide a balance between the coalescent dispersion 26 having jetting reliability and electromagnetic radiation absorbance efficiency. When the carbon black pigment is present in the ink-type formulation, the amount of the ink-type formulation that is added to the coalescent dispersion 26 may be selected so that the amount of the carbon black pigment in the coalescent dispersion 26 is within the given ranges.

It is to be understood that the inorganic nanoparticles in the coalescent dispersion 26 may be the same type of inorganic particles 11 described herein for the build material 12, 12'. The inorganic nanoparticles of the coalescent dispersion 26 may be bare or untreated metal particles, metal alloy particles, metal oxide particles, ceramic particles, and/or combinations thereof. The inorganic nanoparticles in the coalescent dispersion 26 have an average diameter ranging from about 10 nm to about 500 nm. In another example, the inorganic nanoparticles in the coalescent dispersion 26 have an average diameter ranging from about 10 nm to about 100 nm.

The inorganic nanoparticles may be used as core particles that are coated with the polymer 13 as previously described herein in reference to the build material 12, 12'. These coated inorganic nanoparticles may be included in the coalescent dispersion 26.

The inorganic nanoparticles may make up from about 10 wt % to about 40 wt % of the total wt % of the coalescent dispersion 26.

The coalescent dispersion 26 may also include additional components. For example, the coalescent dispersion 26 may include an organic material, such as carbon (e.g., carbon nanofibers). Some examples of other additional components that may be included in the coalescent dispersion 26 are a densification agent, a dispersant, a surfactant, a co-solvent, a biocide, an anti-kogation agent, or combinations thereof.

Similar to the inorganic nanoparticles, the densification agent may be used to further improve the packing density of the coalescent dispersion 26. Some examples of the densification agent(s) may be particles, such as copper, stainless steel, brass, nickel, and combinations thereof. The densification agent(s) may have a particle size ranging from about 1 nm to about 500 nm.

Dispersant(s) may be used to prevent the coalescent dispersion 26 from flocculating. Examples of dispersant(s) may include sodium dodecylsulfate, styrene acrylic polymers, or combinations thereof. A suitable commercially available example of a styrene acrylic polymer includes JONCRYL® 676 (made available by BASF Corp.).

Surfactant(s) may be used to improve the wetting properties of the coalescent dispersion 26. Examples of suitable surfactants include a self-emulsifiable, nonionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™

TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the coalescent dispersion 26 may range from about 0.5 wt % to about 1.4 wt % based on the total wt % of the coalescent dispersion 26.

Some examples of the co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the coalescent dispersion 26.

An anti-kogation agent may be included in the coalescent dispersion 26. Kogation refers to the deposit of dried ink (e.g., coalescent dispersion 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the coalescent dispersion 26 may range from greater than 0.20 wt % to about 0.62 wt % based on the total wt % of the coalescent dispersion 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

While not shown in FIG. 1, in some examples of the method 100, prior to, concurrently with, or after the coalescent dispersion 26 is selectively applied on the desired portion(s) 30, a modifying agent may be selectively applied on different portion(s) (e.g., portions 32) of the build material 12, 12'.

In one example, the modifying agent may include a surfactant, a co-solvent, water, and optionally a biocide. In some examples, the modifying agent 29 consists of these components, and no other components. In another example, the modifying agent 29 includes an inorganic salt, a surfactant, a co-solvent, a humectant, a biocide, and water. In some examples, the modifying agent consists of these components, and no other components. These combinations of components effectively reduce or prevent coalescence bleed into areas/portions that are not to be part of the final 3D object 50.

When the modifying agent includes the inorganic salt, the inorganic salt is water soluble. Examples of suitable water soluble inorganic salts include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in an amount ranging from about 5.0 wt % to about 50 wt % with respect to a total weight of the modifying agent.

The co-solvent that is used in examples of the modifying agent has a lower thermal diffusivity than water. As such, the co-solvent exhibits less heat transfer than water. This characteristic renders the modifying agent as being capable of reducing the energy flow from the build material 12, 12' to the non-fused surroundings having the modifying agent thereon. As such, the modifying agent aids in reducing undesired migration of energy. The total amount of co-solvent present in the modifying agent ranges from about 5.0 wt % up to 30 wt % with respect to the total weight of the modifying agent. As mentioned above, suitable co-solvents at least have a lower thermal diffusivity than water. In some examples, it may also be desirable that the co-solvent(s) have a boiling point greater than 230° C. Examples of suitable co-solvents and some of their physical properties are provided in Table 1.

TABLE 1

Modifying Agent Co-Solvents

| Solvent | Thermal Diffusivity (mm$^2$/s) | Thermal Conductivity (W/(m*K)) | Specific Heat (J/(g*K)) | Density (g/m$^3$) | Boiling Point (° C.) | Flash Point (° C.) |
|---|---|---|---|---|---|---|
| Water | 0.162 | 0.680 | 4.19 | 1.00E+06 | 100 | N/A |
| Trimethylolpropane | 0.145 | 0.256 | 1.58 | 1.12E+06 | 296 | 148 |
| Glycerol | 0.093 | 0.285 | 2.43 | 1.26E+06 | 290 | 160 |
| 1,2,4-Butanetriol | 0.044 | 0.199 | 3.70 | 1.22E+06 | 304 | 154 |
| 1,5-Pentanediol | 0.069 | 0.211 | 3.08 | 9.94E+05 | 239 | 129 |
| 1,4-Butanediol | 0.105 | 0.211 | 1.99 | 1.01E+06 | 228 | 106 |
| 2-Pyrrolidinone | 0.088 | 0.194 | 1.97 | 1.12E+06 | 245 | 136 |
| 2-Hydroxyethyl-2-Pyrrolidinone | no data | no data | no data | 1.16E+06 | 296 | 133 |
| Tripropylene Glycol (TPG) | 0.082 | 0.165 | 1.97 | 1.02E+06 | 265 | 143 |
| Dipropylene Glycol | 0.075 | 0.167 | 2.18 | 1.02E+06 | 232 | 124 |
| Tetraethylene glycol | 0.078 | 0.191 | 2.18 | 1.12E+06 | 328 | 177 |
| Triethylene glycol | 0.080 | 0.196 | 2.18 | 1.13E+06 | 288 | 166 |
| Tripropylene glycol methyl ether | 0.075 | 0.154 | 2.12 | 9.63E+05 | 243 | 121 |

TABLE 1-continued

| | Modifying Agent Co-Solvents | | | | | |
|---|---|---|---|---|---|---|
| Solvent | Thermal Diffusivity (mm²/s) | Thermal Conductivity (W/(m*K)) | Specific Heat (J/(g*K)) | Density (g/m³) | Boiling Point (° C.) | Flash Point (° C.) |
| Triethylene glycol n-butyl ether | 0.076 | 0.160 | 2.13 | 9.90E+05 | 289 | 156 |

It is believed that combinations of the co-solvents listed in Table 1 may also be used.

Examples of the modifying agent also include the surfactant. The type and amount of surfactant may be selected so that a contact angle with a contact line of the build material 12, 12' is less than 90°. In some instances, the contact angle may be less than 45°, which may be desirable to ensure wetting of the build material 12, 12' with the modifying agent.

The components of the modifying agent may be mixed together, and then the amount of surfactant may be adjusted to achieve the desirable contact angle. It has been found that the suitable amount of surfactant may vary depending in part upon the strength of the surfactant and/or whether a combination of surfactants is used. In an example, the surfactant amount may be up to about 1.5 wt % with respect to the total weight of the modifying agent. Examples of suitable surfactants include a self-emulsifiable, nonionic wetting agent based on acetylenic diol chemistry (e.g., SURFYNOL® SEF from Air Products and Chemicals, Inc.), a perfluoro-based ethoxylated nonionic fluorosurfactant (CHEMGUARD® S-550-100 from Tyco Fire & Security GMBH LLC), a non-ionic fluorosurfactant (e.g., CAPSTONE® fluorosurfactants from DuPont, previously known as ZONYL FSO), and combinations thereof.

When included in the modifying agent, the humectant is present in an amount ranging from about 0.1 wt % to about 15 wt %. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof.

As noted above, the modifying agent also includes, in some instances, the biocide. When part of the modifying agent, the biocide is present in an amount ranging from about 0.01 wt % to about 0.2 wt % with respect to the total weight of the modifying agent. Any examples of the biocides provided herein for the coalescent dispersion 26 may be used.

The balance of the modifying agent is water. In an example, the amount of water ranges from about 70 wt % to about 95 wt % of the total weight of the modifying agent.

When used, the modifying agent may be selectively applied in a manner similar to the coalescent dispersion 26. In an example, the modifying agent may be applied at the same time that the coalescent dispersion 26 is dispensed, using a single pass or using multiple passes. In another example, the modifying agent may be applied before or after the coalescent dispersion 26 is dispensed. In an example, the modifying agent may be applied along an edge of the pattern of the e cross-section of the layer of the 3D object to be formed.

After the coalescent dispersion 26 (and in some instances the modifying agent) is selectively applied in the desired area(s) or portion(s) 30, the entire layer 14 of the build material 12 and the coalescent dispersion 26 applied to at least a portion thereof are exposed to electromagnetic radiation. This is shown at step 108 of FIG. 1 and in FIG. 3D.

In an example, the electromagnetic radiation 36 may be infrared or near-infrared radiation. The electromagnetic radiation 36 is emitted from a radiation source 34, such as an IR or near-IR curing lamp, IR or near-IR light emitting diodes (LED), a microwave, or lasers with the desirable electromagnetic wavelengths. In an example, the light source electromagnetic wavelengths range from about 100 nm (UV) to about 10 μm. In another example, the light source is a near-infrared light source with wavelengths of about 800 nm. In yet another example, the radiation source 34 is an infrared light source with wavelengths of about 2 μm. The radiation source 34 may be attached, for example, to a carriage that also holds the inkjet applicator(s) 28. The carriage may move the radiation source 34 into a position that is adjacent to the fabrication bed 22. The radiation source 34 may be programmed to receive commands from the central processing unit and to expose the layer 14 and applied coalescent dispersion 26 to electromagnetic energy (e.g., IR or near-IR energy).

The length of time the radiation 36 is applied for, or the energy exposure time, may be dependent, for example, on one or more of: characteristics of the radiation source 34; characteristics of the build material 12, 12'; and/or characteristics of the coalescent dispersion 26.

It is to be understood that variations in the fusing level may be achieved by altering (increasing or decreasing) the energy exposure time along the X, Y, and/or Z axes. As an example, if it is desirable that the level of fusing decrease along the Z axis, the radiation exposure time may be the highest in the first layer and decrease in subsequently formed layers. In yet another example, variations in the level of fusing may be achieved by altering (increasing or decreasing) the amount of coalescent dispersion 26 that is applied along the X, Y, and/or Z axes.

The coalescent dispersion 26 enhances the absorption of the electromagnetic energy, converts the absorbed electromagnetic to thermal energy, and promotes the transfer of the thermal heat to the build material 12, 12' in contact with the coalescent dispersion 26 (i.e., in the area(s)/portion(s) 30). In an example, the coalescent dispersion 26 sufficiently elevates the temperature of the build material 12 in the area(s) 30 near or above its melting point, allowing fusing (which may include melting, sintering, binding, etc.) of the build material 12, 12' to take place. In a specific example, the temperature is elevated about 50° C. above the melting temperature of the build material 12. The coalescent dispersion 26 may also cause, for example, heating of the build material 12, 12' below its melting point but to a temperature suitable to cause softening and bonding. It is to be understood that area(s) 32 not having the coalescent dispersion 26 applied thereto absorb less energy, and thus the build material 12, 12' within these area(s) 32 generally does not exceed the melting point and does not fuse. This forms one layer 40 of the 3D object 50 (FIGS. 3F and 5) to be formed.

As mentioned above, the exposure to the electromagnetic radiation fuses the build material 12, 12' in the area(s) 30 to form the layer 40 of the 3D object 50. In step 110, the steps 102 through 108 of method 100 in FIG. 1 may be repeated as many times as desirable to create subsequent layers 42, 44, 46 (FIGS. 3E and 3F) and to ultimately form the 3D object 50. It is to be understood that heat absorbed (during the application of energy) by a portion of the build material 12, 12' on which coalescent dispersion 26 has been applied or has penetrated may propagate to a previously solidified layer, such as layer 40, causing at least some of that layer 40 to heat up above its melting point. This effect helps create strong interlayer bonding between adjacent layers (e.g., 40 and 42) of the 3D object 50.

It is to be understood that the subsequently formed layers 42, 44, 46 may have any desirable shape and/or thickness and may be the same as or different from any other layer 40, 42, 44, 46, depending upon the size, shape, etc. of the 3D object 50 that is to be formed.

Figure 3E:
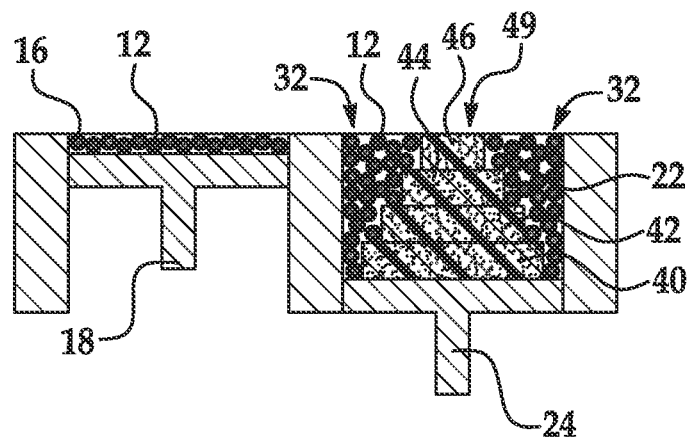
FIG. 3E is a semi-schematic, cross-sectional view of an example of the 3D object that may be formed after performing the steps of FIGS. 3A through 3D several times.
Figure 3F:
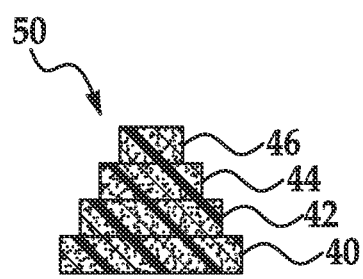
FIG. 3F is a semi-schematic, cross-sectional view of an example of the 3D object formed using an example of the method disclosed herein.

FIG. 3E illustrates one example of a precursor 3D object 49. The precursor 3D object 49 is the precursor of the final 3D object 50 that is to be formed. The precursor 3D object 49 is formed in the fabrication bed 22, and has not been exposed to cleaning, heating, and annealing. In some examples, these additional steps are performed to form the final 3D object.

As illustrated in FIG. 3E, as subsequent layers 42, 44, 46 have been formed, the delivery piston 18 is pushed closer to the opening of the delivery bed 16 and the supply of the build material 12 in the delivery bed 16 is diminished (compared, for example, to FIG. 3A at the outset of the method 100). The fabrication piston 24 is pushed further away from the opening of the fabrication bed 22 in order to accommodate the subsequent layer(s) of build material 12, 12' and selectively applied coalescent dispersion 26. Since at least some of the build material 12, 12' remains unfused after each layer 40, 42, 44, 46 is formed, the precursor object 49 in the fabrication bed 22 is at least partially surrounded by the non-fused build material 12, 12'.

When the precursor 3D object 49 is formed, step 112 of the method 100 shown in FIG. 1 may be performed. The precursor 3D object 49 may be removed from the fabrication bed 22 (e.g., after it cools to below 200° C.), and exposed to a cleaning process that removes non-fused build material 12, 12' from the precursor object 49. Some examples of the cleaning process include brushing, water-jet cleaning, sonic cleaning, blasting, and combinations thereof. The non-fused build material 12, 12' remaining in the fabrication bed 22 may be reused depending, in part, on process conditions.

In step 114 of the method 100 of FIG. 1, the precursor 3D object 49 may be exposed to a heat treatment at a decomposition temperature of the polymer 13 in the build material 12, 12'. In an example, the precursor 3D object 49 is placed in a furnace, and heated to a decomposition temperature of at least 350° C. (e.g., when the melting point of the polymer 13 is less than 300° C.). In some instances, the decomposition temperature may be 450° C. or more. It is to be understood that the decomposition temperature varies depending on what type of polymer 13 is used in the build material 12, 12'. A temperature ramp may be used in order to preserve the geometry of the precursor 3D object 49. In an example, the furnace may be set to a ramp rate ranging from greater than 0° C./min to about 50° C./min. In another example, the furnace may be set to a ramp rate that is less than 10° C./min. When a ramp rate is used, the temperature of the furnace increases at the set rate until the decomposition temperature is reached. Once the decomposition temperature is reached, the polymer 13 decomposes into smaller liquid and/or gaseous fragments. Any liquid fragments will then decompose further until they are sufficiently volatile to vaporize. As such, this heating process removes the polymer 13 from the precursor 3D object 49. In an example, the heat treatment time ranges from about 36 seconds (about 0.01 hours) to about 2 hours.

In another example, the decomposition of the polymer 13 may be accomplished via microwave heating. In an example, a multimode microwave, having an irregular microwave field distribution, may be used. In an example, the precursor 3D object 49 is placed in the multimode microwave and heated to a decomposition temperature of at least 350° C. In an example, the 3D object is microwaved for a time ranging from about 3 seconds (about 0.001 hours) to about 2 hours. The microwave heating may be used when it is desirable to reach the decomposition temperature relatively quickly.

In yet another example, an inert or vacuum environment may be used during the heating process, for example, if the inorganic particles 11 or the inorganic nanoparticles in the coalescent dispersion 26 are sensitive to oxidation. In an example, argon gas, nitrogen gas, or any other inert gas may be used to create the inert environment. The precursor 3D object 49 may be placed in the inert environment and heated to a decomposition temperature of at least 350° C.

The precursor 3D object 49 may then be annealed at the melting temperature of the inorganic particle 11 or at a temperature ranging from about 1° C. to about 300° C. lower than the melting temperature of the inorganic particle 11, as shown in step 116 of the method 100 of FIG. 1. The annealing of the precursor 3D object 49 may be conducted under nitrogen gas, argon gas, hydrogen gas, or a combination thereof. It is to be understood that the precursor 3D object 49 may be placed in a furnace and subjected to a similar ramp rate may be used as described herein for step 114 of the method 100. In addition, the annealing may also be accomplished by microwave heating as previously described herein for step 114 of the method 100. Annealing initiates additional fusing of the inorganic particles 11 and the inorganic nanoparticles, and forms the final 3D object 50 shown in FIG. 3F. The annealing temperature may be ramped down to cool the final 3D object 50.

Figure 5:
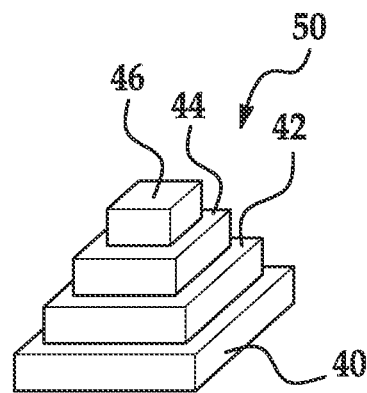
FIG. 5 is a perspective view of the 3D object of FIG. 3F.

FIG. 5 illustrates a perspective view of the 3D object 50. Each of the layers 40, 42, 44, 46 includes fused (melted, sintered, bonded, etc.) inorganic particles 11 and at least some components (e.g., inorganic nanoparticles and any other components that have not evaporated) of the coalescent dispersion 26. The polymer 13 has been decomposed and removed, but due, at least in part, to the thinness of the continuous coating 13' or nano-beads 13", the 3D object 50 exhibits little shrinkage.

Figure 6:
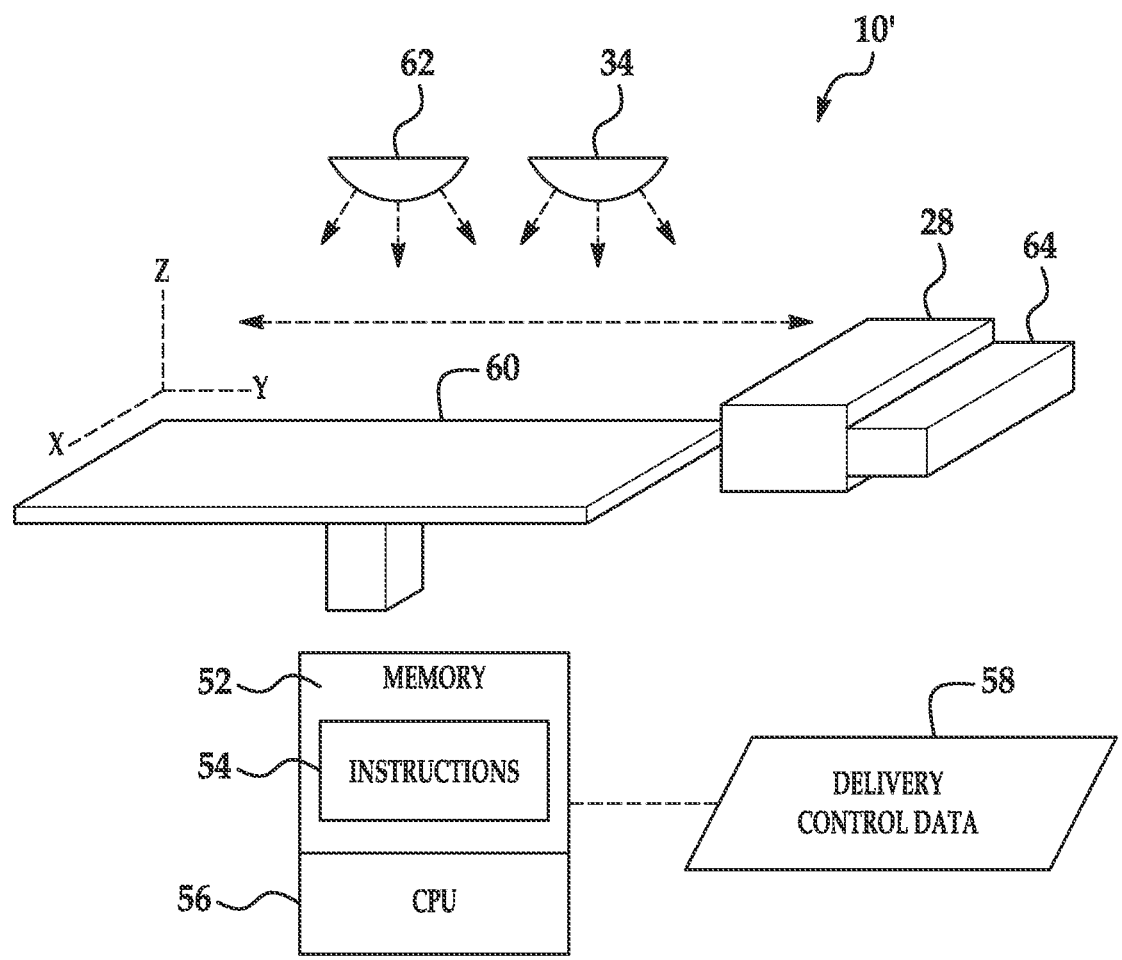
FIG. 6 is a simplified isometric view of an example of a 3D printing system that may be used in an example of the 3D printing method disclosed herein.

Referring now to FIG. 6, another example of the printing system 10' is depicted. The system 10' includes a central processing unit 56 that controls the general operation of the additive printing system 10'. As an example, the central processing unit 56 may be a microprocessor-based controller that is coupled to a memory 52, for example via a communications bus (not shown). The memory 52 stores the computer readable instructions 54. The central processing unit 56 may execute the instructions 54, and thus may control operation of the system 10' in accordance with the instructions 54.

In this example, the printing system 10' includes the inkjet applicator 28 to selectively deliver/apply the coalescent dispersion 26 to a layer 14 (not shown in this figure) of build material 12, 12' provided on a support member 60. In an example, the support member 60 has dimensions ranging from about 10 cm by 10 cm up to about 100 cm by 100 cm, although the support member 60 may have larger or smaller dimensions depending upon the 3D object 50 that is to be formed.

The central processing unit 56 controls the selective delivery of the coalescent dispersion 26 to the layer 14 of the build material 12 in accordance with delivery control data 58.

In the example shown in FIG. 6, it is to be understood that the inkjet applicator 28 is a printhead, such as a thermal printhead or a piezoelectric inkjet printhead. The inkjet applicator 28 may be a drop-on-demand printhead or a continuous drop printhead.

The inkjet applicator 28 may be used to selectively deliver the coalescent dispersion 26 when in the form of a suitable fluid. As described above, the coalescent dispersion 26 includes an aqueous vehicle, such as water, the coalescent agent, the inorganic nanoparticles, and, in some instances, other suitable components, such as a co-solvent, a surfactant, etc., to enable it to be delivered via the inkjet applicator 28.

In one example, the inkjet applicator 28 may be selected to deliver drops of the coalescent dispersion 26 at a resolution ranging from about 300 dots per inch (DPI) to about 1200 DPI. In other examples, the inkjet applicator 28 may be selected to be able to deliver drops of the coalescent dispersion 26 at a higher or lower resolution.

The inkjet applicator 28 may include an array of nozzles through which the inkjet applicator 28 is able to selectively eject drops of fluid. In one example, each drop may be in the order of about 10 pico liters (pl) per drop, although it is contemplated that a higher or lower drop size may be used. In some examples, inkjet applicator 28 is able to deliver variable size drops.

The inkjet applicator 28 may be an integral part of the printing system 10', or it may be user replaceable. When the inkjet applicator 28 is user replaceable, it may be removably insertable into a suitable distributor receiver or interface module (not shown).

In another example of the printing system 10', a single inkjet printhead may be used to selectively deliver different coalescent dispersions 26. For example, a first set of printhead nozzles of the printhead may be configured to deliver one of the coalescent dispersions 26, and a second set of printhead nozzles of the printhead may be configured to deliver the other of the coalescent dispersions 26.

As shown in FIG. 6, the inkjet applicator 28 has a length that enables it to span the whole width of the support member 60 in a page-wide array configuration. In an example, the page-wide array configuration is achieved through a suitable arrangement of multiple inkjet applicators 28. In another example, the page-wide array configuration is achieved through a single inkjet applicator 28 with an array of nozzles having a length to enable them to span the width of the support member 60. In other examples of the printing system 10', the inkjet applicator 28 may have a shorter length that does not enable them to span the whole width of the support member 60.

While not shown in FIG. 6, it is to be understood that the inkjet applicator 28 may be mounted on a moveable carriage to enable it to move bi-directionally across the length of the support member 60 along the illustrated Y-axis. This enables selective delivery of the coalescent dispersion 26 across the whole width and length of the support member 60 in a single pass. In other examples, the inkjet applicator 28 may be fixed while the support member 60 is configured to move relative thereto.

As used herein, the term 'width' generally denotes the shortest dimension in the plane parallel to the X and Y axes shown in FIG. 6, and the term 'length' denotes the longest dimension in this plane. However, it is to be understood that in other examples the term 'width' may be interchangeable with the term 'length'. As an example, the inkjet applicator 28 may have a length that enables it to span the whole length of the support member 60 while the moveable carriage may move bi-directionally across the width of the support member 60.

In examples in which the inkjet applicator 28 has a shorter length that does not enable them to span the whole width of the support member 60, the inkjet applicator 28 may also be movable bi-directionally across the width of the support member 60 in the illustrated X axis. This configuration enables selective delivery of the coalescent dispersion 26 across the whole width and length of the support member 60 using multiple passes.

The inkjet applicator 28 may include therein a supply of the coalescent dispersion 26, or may be operatively connected to a separate supply of the coalescent dispersion 26.

As shown in FIG. 6, the printing system 10' also includes a build material distributor 64. This distributor 64 is used to provide the layer (e.g., layer 14) of the build material 12, 12' on the support member 60. Suitable build material distributors 64 may include, for example, a wiper blade, a roller, or combinations thereof.

The build material 12, 12' may be supplied to the build material distributor 64 from a hopper or other suitable delivery system. In the example shown, the build material distributor 64 moves across the length (Y axis) of the support member 60 to deposit a layer of the build material 12, 12'. As previously described, a first layer of build material 12, 12' will be deposited on the support member 60, whereas subsequent layers of the build material 12, 12' will be deposited on a previously deposited (and solidified) layer.

It is to be further understood that the support member 60 may also be moveable along the Z axis. In an example, the support member 60 is moved in the Z direction such that as new layers of build material 12 are deposited, a predetermined gap is maintained between the surface of the most recently formed layer and the lower surface of the inkjet applicator 28. In other examples, however, the support member 60 may be fixed along the Z axis and the inkjet applicator 28 may be movable along the Z axis.

Similar to the system 10, the system 10' also includes the radiation source 34 to apply energy to the deposited layer of build material 12, 12' and the selectively applied coalescent dispersion 26 to cause the solidification of portion(s) 32 of the build material 12, 12'. Any of the previously described radiation sources 34 may be used. In an example, the radiation source 34 is a single energy source that is able to uniformly apply energy to the applied materials, and in another example, radiation source 34 includes an array of energy sources to uniformly apply energy to the deposited materials.

In the examples disclosed herein, the radiation source 34 is configured to apply energy in a substantially uniform manner to the whole surface of the deposited build material 12. This type of radiation source 34 may be referred to as an unfocused energy source. Exposing the entire layer to energy simultaneously may help increase the speed at which a three-dimensional object 50 may be generated.

While not shown, it is to be understood that the radiation source 34 may be mounted on the moveable carriage or may be in a fixed position.

The central processing unit 56 may control the radiation source 34. The amount of energy applied may be in accordance with delivery control data 58.

The system 10' may also include a pre-heater 62 that is used to pre-heat the deposited build material 12, 12' (as shown and described in reference to FIG. 3B). The use of the pre-heater 62 may help reduce the amount of energy that has to be applied by the radiation source 34.

Still further, the system 10' may include tools and components to perform the cleaning, heating, and annealing steps previously described.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5° C. to about 50° C. below the melting point of the polymer should be interpreted to include not only the explicitly recited limits of about 5° C. to about 50° C. below the melting point of the polymer, but also to include individual values, such as 7° C. below the melting point of the polymer, 35° C. below the melting point of the polymer, 12.5° C. below the melting point of the polymer, etc., and sub-ranges, such as from about 10° C. to about 45° C. below the melting point of the polymer, from about 15° C. to about 40° C. below the melting point of the polymer, etc. Furthermore, when "about" is utilized to describe a value, this is meant to encompass minor variations (up to +/−1-10%) from the stated value.

In describing and claiming the examples disclosed herein, the singular forms "a", "an", and "the" include plural referents unless the context clearly dictates otherwise.

While several examples have been described in detail, it will be apparent that the disclosed examples may be modified. Therefore, the foregoing description is to be considered non-limiting.

What is claimed is:

1. A three-dimensional (3D) printing method, comprising:
   applying a build material onto a fabrication bed, the build material consisting of:
      an inorganic particle; and
      a polymer attached to the inorganic particle, the polymer being nano-beads having an average diameter ranging from about 3 nm to about 1500 nm;
   heating the build material to a temperature ranging from about 5° C. to about 50° C. below a melting point of the polymer;
   selectively applying a coalescent dispersion on a portion of the build material with an inkjet applicator, the coalescent dispersion including:
      a carbon black pigment present in the coalescent dispersion in an amount ranging from about 3.0 wt % to about 6.0 wt % based on the total wt % of the coalescent dispersion; and
      inorganic nanoparticles having an average diameter ranging from about 10 nm to about 500 nm, wherein the inorganic nanoparticles make up from about 10 wt % to about 40 wt % of the total wt % of the coalescent dispersion; and
   exposing the applied build material and the applied coalescent dispersion to an electromagnetic radiation with a radiation source, whereby the coalescent dispersion absorbs the electromagnetic radiation and heats up the portion of the build material in contact with the coalescent dispersion to fuse the portion of the build material in contact with the coalescent dispersion and to form a layer of a three-dimensional (3D) object.

2. The 3D printing method as defined in claim 1 wherein the build material is applied on a contact surface of the fabrication bed, and the coalescent dispersion is selectively applied on the portion of the build material in a pattern of a cross-section of the layer of the 3D object to be formed, the cross-section being parallel to the contact surface.

3. The 3D printing method as defined in claim 1, further comprising:
   depositing an other layer of the build material on the layer of the 3D object;
   selectively applying an other layer of the coalescent dispersion on at least a portion of the other layer of the build material; and
   exposing the other layer of the build material and the other layer of the coalescent dispersion to electromagnetic radiation, whereby the coalescent dispersion absorbs the electromagnetic radiation and converts the absorbed electromagnetic radiation to thermal energy, whereby the coalescent dispersion absorbs the electromagnetic radiation and heats up the portion of the other layer of the build material in contact with the other layer of the coalescent dispersion to fuse the portion of the other layer of the build material in contact with the other layer of the coalescent dispersion and to form an other layer of the 3D object.

4. The 3D printing method as defined in claim 3, further comprising repeating the depositing, the selectively applying, and exposing to create subsequent layers of the 3D object.

5. The 3D printing method as defined in claim 4, further comprising:
   exposing the 3D object to a cleaning process, thereby removing any non-fused build material from the 3D object, the cleaning process being selected from the group consisting of brushing, water-jet cleaning, sonic cleaning, blasting, and combinations thereof; and
   exposing the 3D object to a heat treatment at a decomposition temperature of the polymer, thereby removing the polymer from the 3D object.

6. The 3D printing method as defined in claim 5, further comprising annealing the 3D object at a melting temperature of the inorganic particle or at a temperature ranging from 1° C. to about 300° C. lower than the melting temperature of the inorganic particle.

7. The 3D printing method as defined in claim 1 wherein:
   the build material includes the polymer in an amount ranging from about 0.1 wt % to about 10 wt % of a total weight percent of the inorganic particle in the build material; and
   wherein the polymer has a glass transition temperature ranging from about 0° C. to about 200° C.

8. The 3D printing method as defined in claim 1 wherein a packing density of the applied build material and the applied coalescent dispersion ranges from about 0.35 g/cm$^3$ to about 0.9 g/cm$^3$.

9. The 3D printing method as defined in claim 1 wherein the inorganic nanoparticles in the coalescent dispersion include:
- a core particle selected from the group consisting of a metal, a metal alloy, a metal oxide, a ceramic, and combinations thereof; and
- an other polymer attached to the core particle, the other polymer being i) a continuous coating having a thickness ranging from about 3 nm to about 1500 nm, or ii) nano-beads having an average diameter ranging from about 3 nm to about 1500 nm.

10. A three-dimensional (3D) printing system, comprising:
- a fabrication bed;
- a build material to be introduced into the fabrication bed, the build material consisting of:
  - an inorganic particle; and
  - a polymer attached to the inorganic particle, the polymer being nano-beads having an average diameter ranging from about 3 nm to about 1500 nm;
- an inkjet applicator;
- a coalescent dispersion to be selectively introduced by the inkjet applicator onto the build material in the fabrication bed, the coalescent dispersion including:
  - a carbon black pigment present in the coalescent dispersion in an amount ranging from about 3.0 wt % to about 6.0 wt % based on a total weight percent of the coalescent dispersion; and
  - inorganic nanoparticles having an average diameter ranging from about 10 nm to about 500 nm, wherein the inorganic nanoparticles make up from about 10 wt % to about 40 wt % of the total weight percent of the coalescent dispersion;
- a radiation source to expose the coalescent dispersion and the build material in the fabrication bed to electromagnetic radiation.

11. The 3D printing system as defined in claim 10, wherein the build material includes the polymer in an amount ranging from about 0.1 wt % to about 10 wt % of a total weight percent of the inorganic particle in the build material.

12. The 3D printing system as defined in claim 10, wherein:
- the inorganic particle of the build material is selected from the group consisting of a metal, a metal alloy, a metal oxide, a ceramic, and combinations thereof; and
- the polymer of the build material has a glass transition temperature ranging from about 0° C. to about 200° C.

13. The 3D printing system as defined in claim 10, wherein the inorganic particle of the build material is a metal, a metal alloy, a metal oxide, a ceramic, or a combination thereof having a particle density ranging from about 1 $g/cm^3$ to about 10 $g/cm^3$ and a particle size ranging from about 1 µm to about 100 µm.

14. The 3D printing system as defined in claim 10, wherein:
- the inorganic nanoparticles in the coalescent dispersion include:
  - a core particle selected from the group consisting of a metal, a metal alloy, a metal oxide, a ceramic, and combinations thereof; and
  - an other polymer attached to the core particle, the other polymer being i) a continuous coating having a thickness ranging from about 3 nm to about 1500 nm, or ii) nano-beads having an average diameter ranging from about 3 nm to about 1500 nm; and
- the coalescent dispersion further includes a densification agent, a dispersant, a surfactant, a co-solvent, a biocide, or combinations thereof.

15. The 3D printing system as defined in claim 14, wherein the other polymer is a polymer or a copolymer formed from a styrene monomer, an acrylic monomer, a derivative of an acrylic monomer, or a combination thereof, polyethylene, polypropylene, polyurethane, or a combination thereof.

16. The 3D printing system as defined in claim 10, wherein the inkjet applicator is a thermal inkjet printhead or a piezoelectric inkjet printhead.

* * * * *